(12) United States Patent
Lavender

(10) Patent No.: US 6,489,744 B2
(45) Date of Patent: Dec. 3, 2002

(54) BATTERY CHARGER WITH MOVABLE BATTERY FITTING

(75) Inventor: Paul Lavender, Chaldon Surrey (GB)

(73) Assignee: PAG Limited, London (GB)

( * ) Notice: Subject to any disclaimer, the term of this patent is extended or adjusted under 35 U.S.C. 154(b) by 0 days.

(21) Appl. No.: 09/776,373

(22) Filed: Feb. 2, 2001

(65) Prior Publication Data

US 2001/0019254 A1 Sep. 6, 2001

Related U.S. Application Data

(63) Continuation-in-part of application No. 09/528,664, filed on Mar. 20, 2000, now abandoned.

(30) Foreign Application Priority Data

Feb. 9, 2000 (GB) .............................................. 0002971

(51) Int. Cl.[7] .............................................. H01M 10/46
(52) U.S. Cl. ...................................................... 320/107
(58) Field of Search ................................. 320/107, 110, 320/112, 113, 115

(56) References Cited

U.S. PATENT DOCUMENTS

| 4,629,962 | A | | 12/1986 | Arakawa | |
| 5,256,954 | A | | 10/1993 | Chen | |
| 5,287,052 | A | | 2/1994 | Wang | |
| 5,592,064 | A | * | 1/1997 | Morita | |
| 5,777,453 | A | | 7/1998 | Imanaga | |
| 5,821,732 | A | | 10/1998 | Chen | |
| 5,844,401 | A | | 12/1998 | Lee | ............................ 320/107 |

FOREIGN PATENT DOCUMENTS

| EP | 0 152 650 A1 | 8/1985 |
| EP | 0 506 439 A1 | 3/1992 |

* cited by examiner

Primary Examiner—Edward H. Tso
(74) Attorney, Agent, or Firm—Thomas, Kayden, Horstemeyer & Risley, LLP

(57) ABSTRACT

A casing for a battery charger has an internal volume for accommodating the charging and control components of a charger and a front panel including a plurality of openings for accommodating a display and control switches. Connected to a side of the casing, there is provided a battery fitting which includes a guide member fixed to the casing and a carriage which can slide reciprocally in the guide member. A battery is placed on the same table top as the charger and engages the fitting for mechanical and electrical coupling to the charger. The sliding nature of the fitting can accommodate different size batteries. Furthermore, as the charger does not support the battery, the charger can be made smaller and lighter.

9 Claims, 7 Drawing Sheets

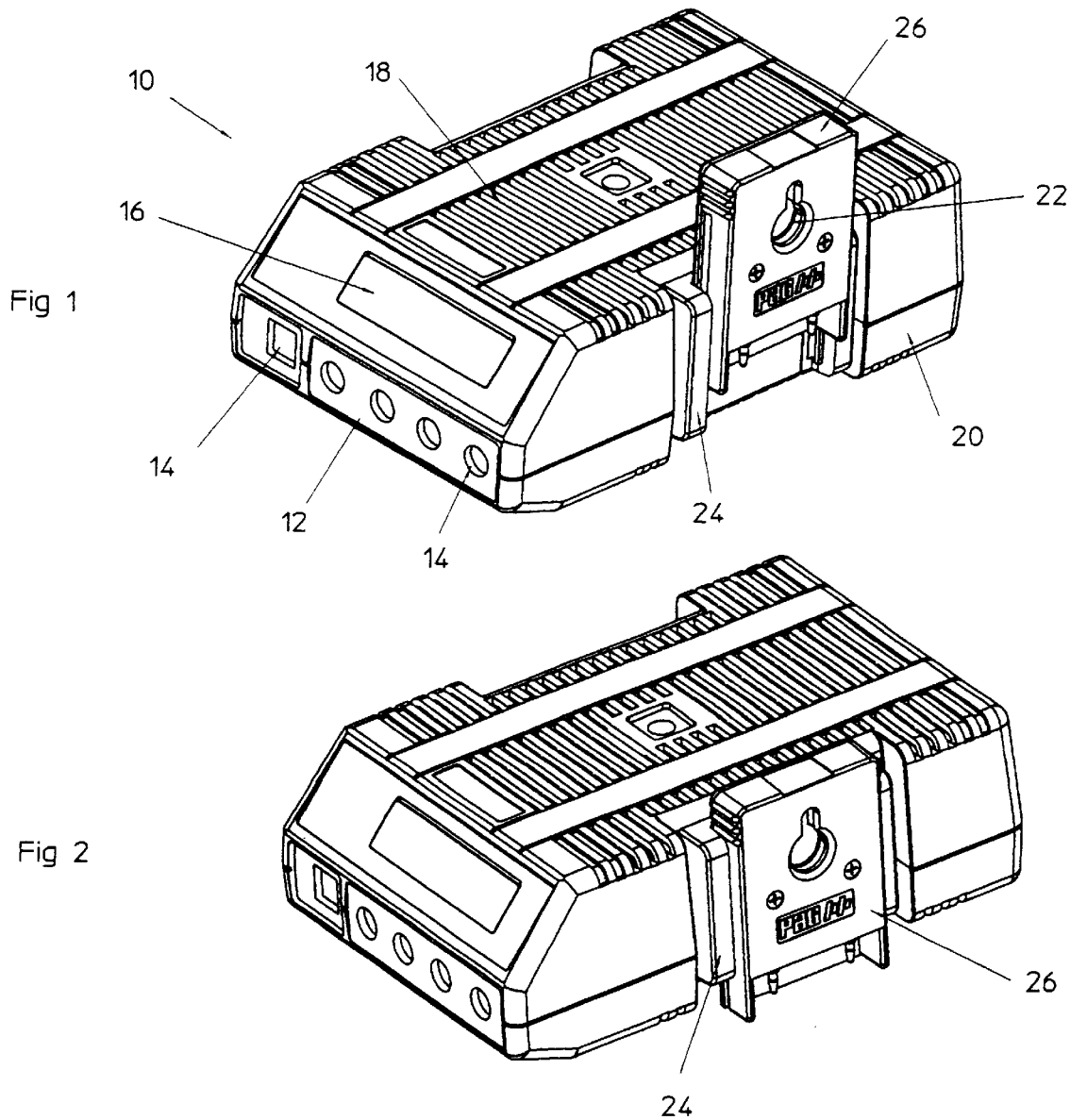

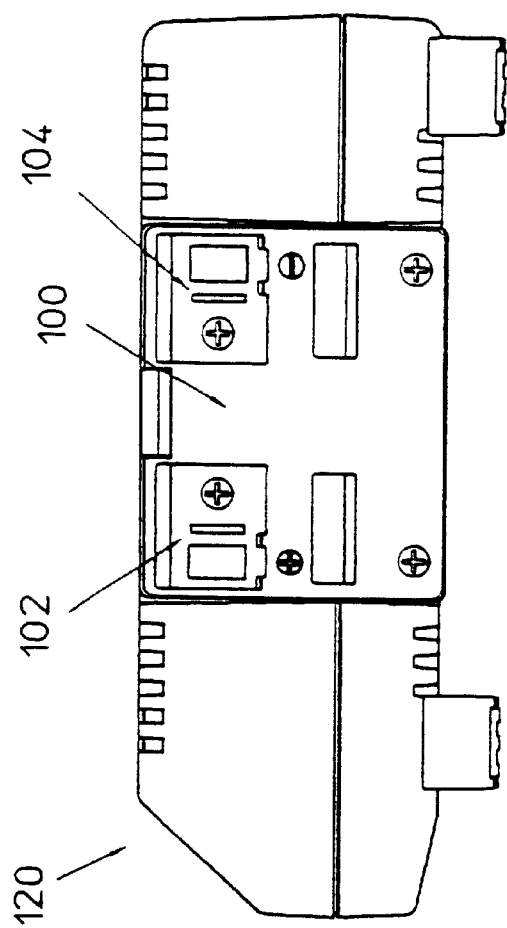
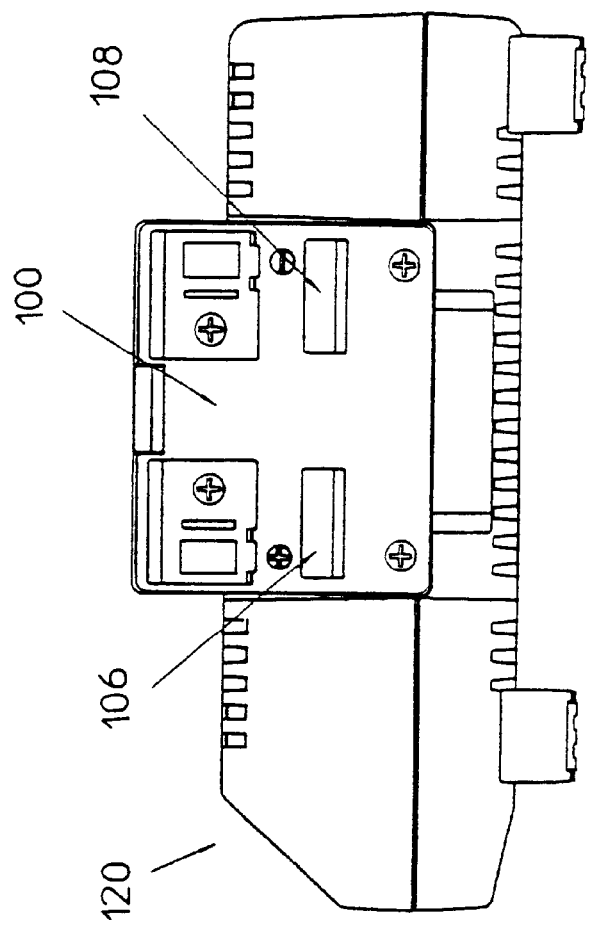
Fig 8a
Fig 8b

BATTERY CHARGER WITH MOVABLE BATTERY FITTING

CROSS-REFERENCE TO RELATED APPLICATION

This application is a continuation-in-part of U.S. utility application entitled, "Battery Charger," having Ser. No. 09/528,664, filed Mar. 20, 2000, abandoned, which is entirely incorporated herein by reference.

BACKGROUND OF THE INVENTION

The present invention relates to a battery charger, in particular of a type in which a battery to be charged is coupled to the charger itself during charging.

SUMMARY OF THE PRIOR ART

Known chargers of this type include one or more fittings to secure a battery to the charger with the electrical terminals of the battery in contact with corresponding terminals of the charger. The fittings ensure that the battery cannot move, which could result in loss of electrical contact. The batteries are typically heavy, so it is known to provide the fittings in a position which allows the batteries to rest on the same surface (such as a table top) as the charger itself.

A problem with such a charger is that batteries, even of the same type, vary in size in dependence upon numerous factors including battery capacity and manufacturer. In order to accommodate for such differences in battery size, chargers are either provided for specific batteries, which makes the charger less attractive commercially, or are provided with fittings in different positions on the casing.

An alternative solution has been to provide the fittings on a top surface of the charger such that the batteries rest on the charger itself. However, this does not normally provide as good an electrical and mechanical connection and can cause instability of the charger because of the weight of the batteries (particularly if not provided symmetrically on the charger top), which needs to be mitigated against in practice by making the charger heavy. A heavy charger is not only more expensive to produce and supply but is also less portable.

SUMMARY OF THE INVENTION

The present invention seeks to provide an improved battery charger.

According to an aspect of the present invention, there is provided a battery charger including a casing locatable on a support surface, a charging module within the casing and at least one battery fitting on the exterior of the casing to which a battery can be fitted, the fitting providing electrical coupling between a battery and the charging module, wherein the at least one battery fitting is movable relative to the casing such that a battery coupled thereto is placeable on the same support surface as the casing.

Preferably, the fitting is movable from a battery non-engaging to a battery engaging position. This feature can allow the movable fitting to accommodate any size differences in batteries.

In the preferred embodiment, a battery can be placed on the same surface as the charger and the battery fitting moved to the battery itself until electrical coupling therewith is established. Thus, the charger need not support the battery or batteries to be charged thereby, avoiding the need to make the charger sufficiently heavy to give adequate support. As the batteries are typically heavy because of their electrical capacities, this can be a significant advantage.

Advantageously, the fitting is provided in a carriage reciprocally slideable within a guide on the casing.

The fitting is preferably designed such that it can provide charging current in most of and most preferably all or substantially all of its positions.

The charger may be provided with a plurality of such fittings, for example four, all being movable.

According to another aspect of the present invention, there is provided a battery charger casing including at least one battery fitting on the exterior of the casing to which a battery can be fitted, the fitting providing electrical coupling between a battery and the charging module, wherein the or at least one battery fitting is movable between upper and lower positions for allowing a battery coupled thereto to rest on a same support surface as the casing.

DESCRIPTION OF THE DRAWINGS

Embodiments of the present invention are described below, by way of example only, with reference to the accompanying drawings, in which:

FIG. 1 is a perspective view of an embodiment of a battery charger with a fitting in an uppermost position;

FIG. 2 is a perspective view of the battery charger of FIG. 1 with the fitting in an lowermost position;

FIGS. 8a and 8b are side elevational views of an embodiment of a battery charger with the fitting of FIG. 7.

DESCRIPTION OF THE PREFERRED EMBODIMENTS

Figure 3:
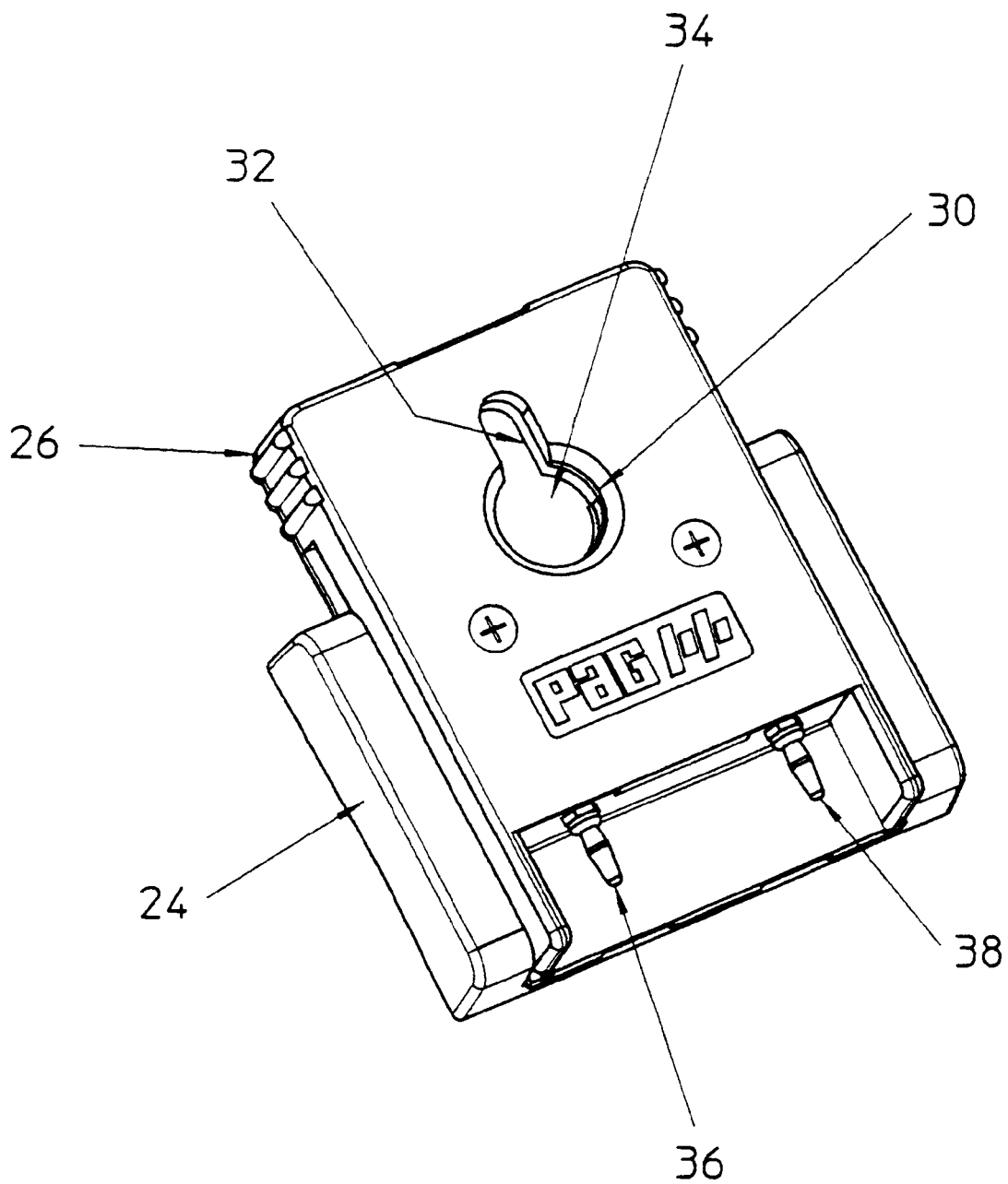
FIG. 3 is a front perspective view of the fitting of FIGS. 1 and 2.

Referring to FIGS. 1 and 2, there is shown the casing 10 for a battery charger. This particular example is for use with professional camera batteries. The casing 10 has an internal volume for accommodating the usual charging and control components, which are all well known in the art, and a front panel 12 including a plurality of openings 14, 16 for accommodating a display and control switches.

The casing 10 also includes slotted openings 18 in its main portion for cooling purposes.

Connected to a side 20 of the casing 10, there is provided a battery fitting 22 which includes a guide member 24 fixed to the casing 10 and a carriage 26 which can slide reciprocally in the guide member 24.

As better seen in FIG. 3, the carriage 26 of the fitting 22 is provided with a fixing slot 30 having a narrow upper portion 32 which extends to a generally circular and larger lower portion 34 which could be described as an inverted key-hole slot.

At a lower wall of the carriage 26 there are provided two spaced and depending electrical terminals 36, 38.

Figure 4:
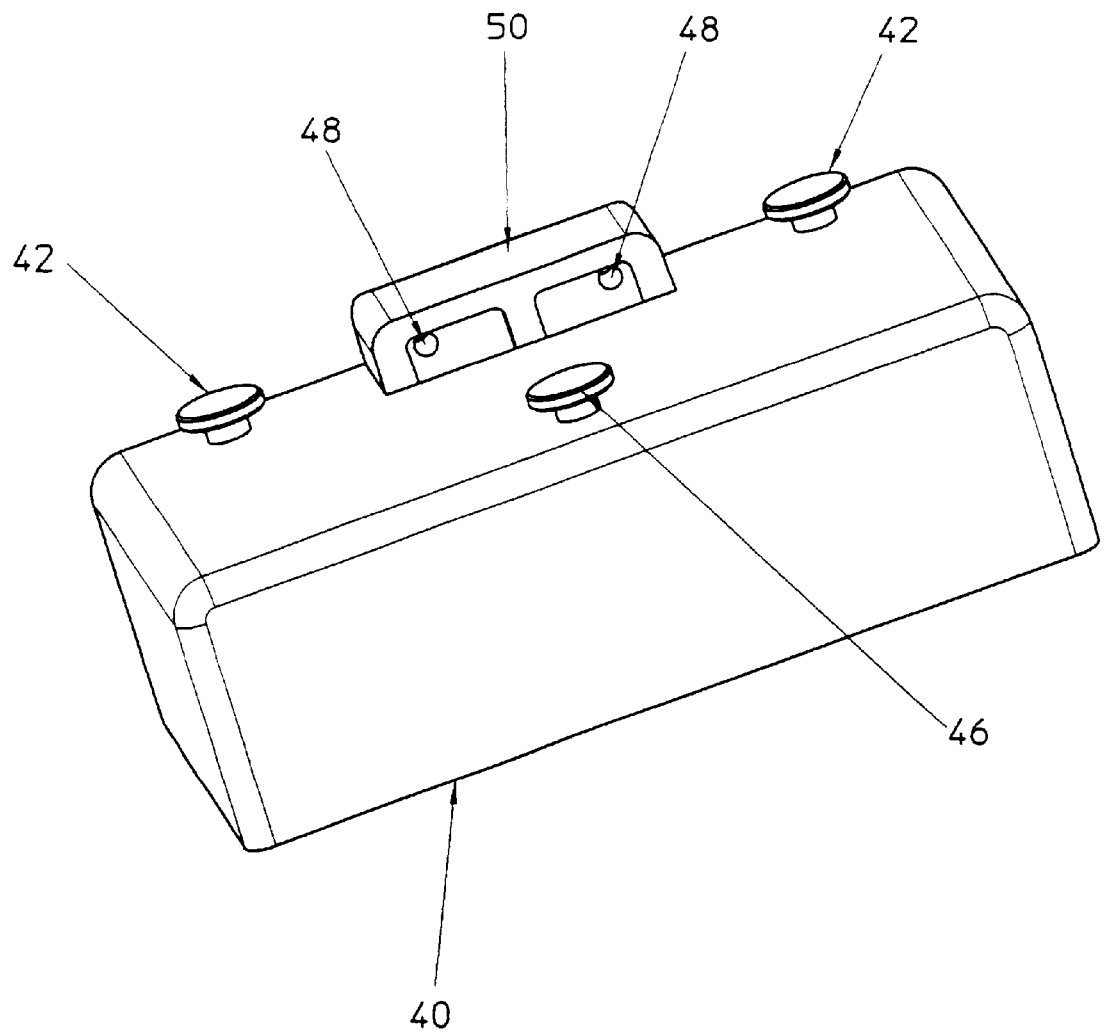
FIG. 4 is a perspective view of a typical battery for the embodiment of the charger shown in FIGS. 1 and 2.

The inverted key-hole slot 30 and the electrical terminals 36, 38 are configured and dimensioned to fit a standard professional camera battery. An example of such a battery is shown in FIG. 4.

The battery 40 includes a plurality of enlarged headed protrusions 42, 46 and female electrical terminals 48 provided in the bottom wall of a protruding portion 50 of the battery 40.

The configuration of the protrusions 42, 46 and the electrical terminals 48 is generally standard in the field. For this purpose, carriage 26 of the charger 10 replicates this configuration for its slot 30 and electrical fittings 36 and 38.

Although the configuration for the elements 46 and 48 of the battery 40 is standard, the overall size of the different batteries on sale is not, with some batteries being physically larger than others. The sliding nature of the carriage 26 accommodates for these size differences, as is explained in detail below.

Figure 5:
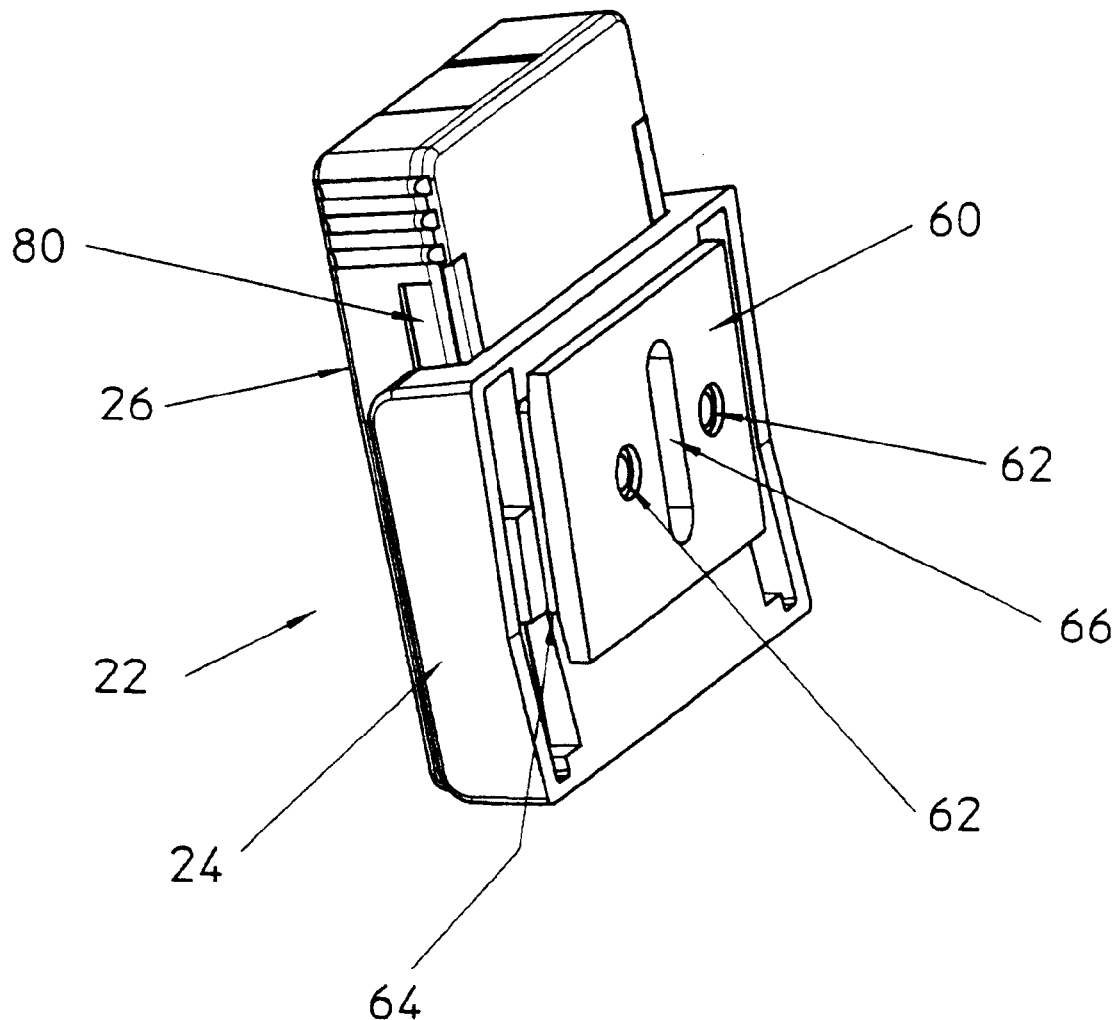
FIG. 5 is a rear perspective view of the fitting of FIGS. 1 and 2.

Referring now to FIG. 5, the guide member 24 of the fitting 22 is provided with a mounting plate 60 which can be fixed to guide member 24 by means of suitable screws (not shown) which fit into appropriate bore holes 62 in the mounting plate 60. It can be seen in FIG. 5 that the mounting plate 60 is spaced from the remainder of the guide member 24 by virtue of a collar 64. This enables a wall of the casing 12 to fit between the mounting plate 60 and the remainder of the guide member 24, with the collar 64 being located in an aperture (not shown) of the casing wall.

Also provided in the mounting plate 60 is an elongated slot 66 which in use accommodates the electrical cables between the charger and the terminals 36 and 38 of the carriage 26. For this purpose, the carriage 26 includes an aperture (not shown) in a rear wall thereof which is aligned with the slot 66 for receiving the electrical cables. Of course, the slot 66 accommodates the electrical cables in all of the positions of the carriage 26.

Figure 6:
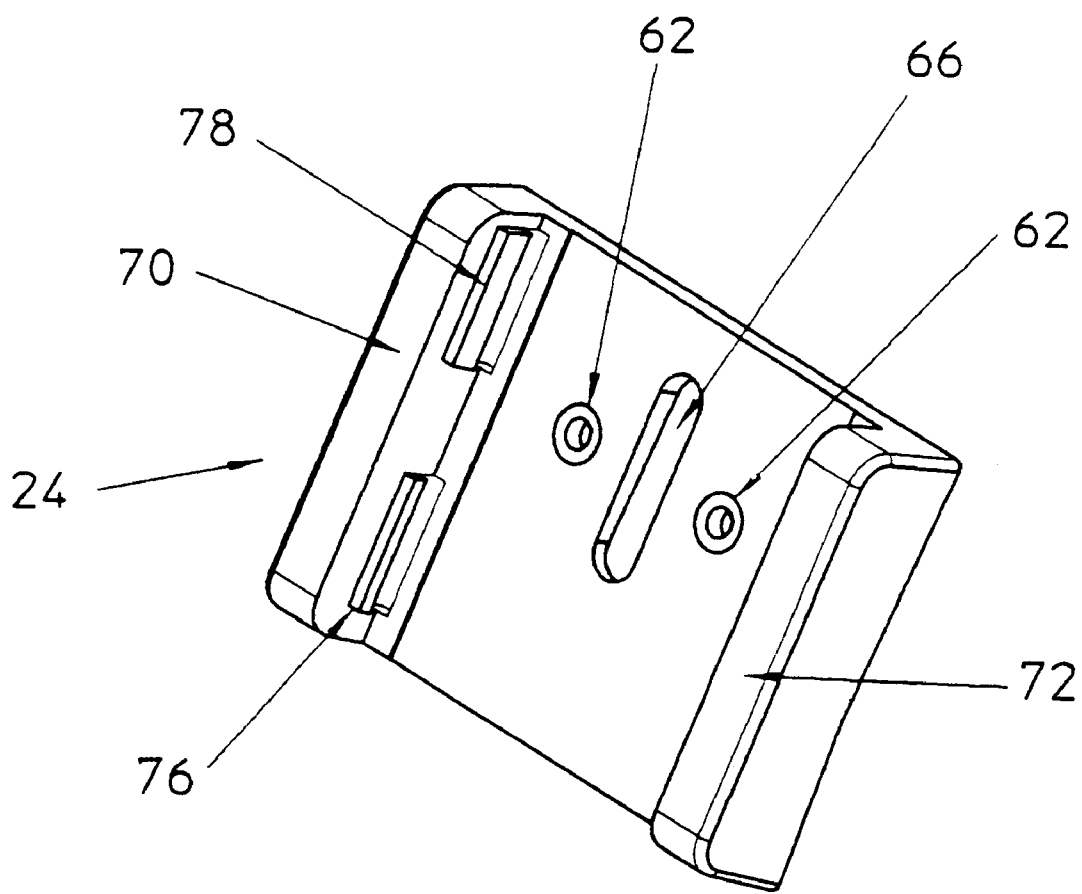
FIG. 6 is a front perspective view of an example of a guide member of the fitting of FIGS. 3 and 5.

Referring now to FIG. 6, the front of the guide member 24 can be seen. The guide is provided with two side walls 70, 72, each of which is provided with two longitudinally aligned flanges 76, 78 which fit into a recess 80 (FIG. 5) in each side of the carriage 26. The upper flange 78 is of greater transverse width than the lower flange 76 and provides in use a stop to the recess 80 of the carriage 26 to prevent the carriage 80 from being completely removed from the casing 12 of the charger 10.

The charger 10 is used as follows. A battery 40 such as that shown in FIG. 4 is placed on the same surface as the charger 10, typically on a table top, close to the fitting 22. The carriage is raised to a height sufficient such that the rounded portion 34 of the aperture 30 is substantially aligned with the enlarged headed protrusion 46 of the battery 40. The battery 40 is then moved close to the charger 10 such that the enlarged head of the protrusion 46 fits fully within the aperture 34, allowing the carriage then to be lowered. Upon such lowering action, the neck of the protrusion 46 slides into the narrow portion 32 of the aperture 30 to secure the enlarged head of the protrusion 46 in the carriage and thus the battery 40 to the charger. In the same action, the terminals 36 and 38 mate with the female terminals 48 of the battery 40 to effect the electrical coupling of the charger to the battery.

Charging of the battery 40 can then take place, in known manner. At the end of charging, the carriage 26 is raised to decouple the electrical terminals 36, 38 and 48 and to detach the protrusion 46.

As the carriage 26 can be positioned at any point along its range of travel and still provide coupling to the charging unit, different size batteries 40 are accommodated automatically. Moreover, the weight of the battery 40 is not carried by the charger 10 but by the surface upon which the battery and/or the charger is placed. Thus there is no need for the charger 10 to be of a size and weight to support the weight of a battery and can therefore be made smaller and lighter, as desired.

The vertical sliding nature of the carriage 26 in the preferred embodiment provides a reliable mechanical and therefore electrical coupling of a battery to the charger 10.

In the preferred embodiment, the casing, guide member and the carriage are made of a light-weight material such as a plastics material.

Although the carriage 26 has been shown with particular mechanical and electrical fittings, it will be apparent that these are dependent upon the type of battery to be charged and may therefore be different for different battery types.

It will be apparent that the charger 10 could have more that one charging fitting 22, for example four. Moreover, different fittings 22 could be provided on the same charger for accommodating different battery types.

Figure 7:
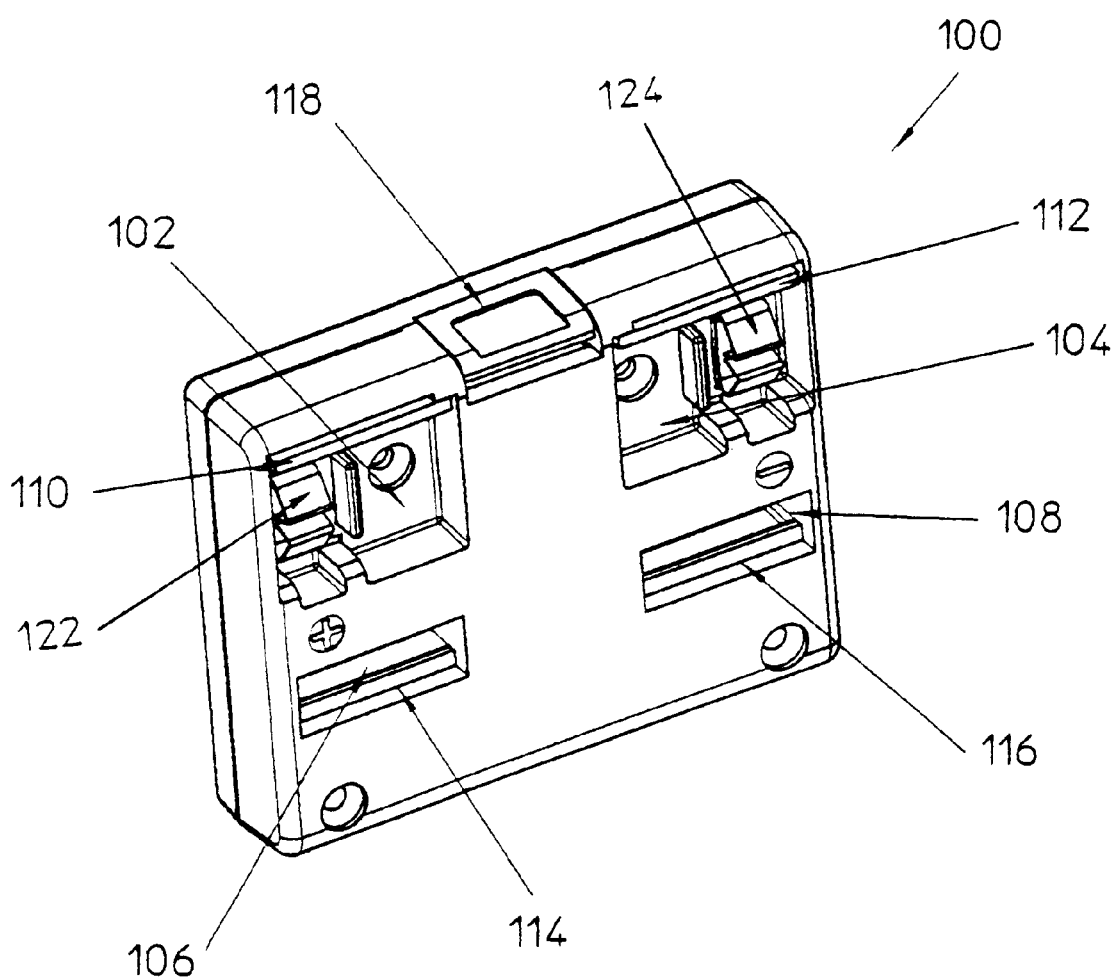
FIG. 7 is a perspective view of another example of a charger fitting.

FIG. 7 shows another example of charger fitting 100. In this example, the fitting includes a plurality of recesses 102, 104, 106, 108 for receiving corresponding protrusions (not shown in FIG. 7) from a battery. Reciprocally movable latches 110, 112, 114, 116 are preferably provided, controlled by a release button 118. First and second sprung clips 122, 124 provide the electrical terminals for the battery.

Referring now to FIGS. 8a and 8b, the embodiment of battery charger 120 shown is provided with movable charger fitting 100 similar in arrangement and construction to the system described in connection with FIGS. 1 to 6. The difference lies in the couplings to the battery. For this purpose, a battery (not shown) is provided with protrusions substantially corresponding in shape and size to the recesses 102, 104, 106, 108 of the fitting 100. The protrusions include electrical terminals which couple to the sprung terminals of the fitting 100. Moreover, the protrusions include catch elements (not shown) engageable with the latches 110, 112, 114, 116 of the fitting 100 for keeping the battery coupled to the fitting 100 until released therefrom by actuation of the button 118.

The example of charger 120 of FIGS. 8a and 8b is provided with two fittings 100, one at each side of the casing. Of course, the number of fittings 100 and their location around the periphery of the casing 120 is a matter of design choice.

The fitting of a battery (not shown) to one of the fittings 100 is carried out by a substantially horizontal motion. That is, the recesses 102, 104, 106, 108 are aligned with their corresponding protrusions of the battery and then, by a substantially horizontal engaging action, the battery is latched to the fitting 100. Then, the combination of battery and fitting 100 is slid in a vertical plane until the battery rests on the same surface as the charger 120. Therefore, the weight of the battery is not supported by the casing, and vice versa.

It will be apparent to the skilled person that a battery charger according to the present teachings can have different battery fittings to accommodate different types of battery. One example is a charger having one or more fittings 26 as shown in FIGS. 1 to 3 and one or more fittings as shown in FIGS. 8a and 8b. Thus, a single charger with these fittings can accommodate both the batteries of FIGS. 4 and 7.

Modifications may be made to the specific embodiments described within the scope of the appended claims.

I claim:

1. A battery charger including a casing locatable on a support surface, a charging module within the casing and at least one battery fitting mounted on the exterior of the casing to which a battery can be fitted, the fitting providing electrical coupling between a battery and the charging module, wherein the at least one battery fitting is movable relative to the casing such that a battery coupled thereto is placeable on the same support surface as the casing.

2. A battery charger including a casing locatable on a support surface, a charging module within the casing and at least one battery fitting on the exterior of the casing to which a battery can be fitted, the fitting providing electrical coupling between a battery and the charging module, wherein the at least one battery fitting is movable relative to the casing such that a battery coupled thereto is placeable on the same support surface as the casing, wherein the fitting is provided in a carriage reciprocally slideable within a guide on the casing.

3. A battery charger according to claim 1, wherein the fitting can provide charging current in most of its positions.

4. A battery charger according to claim 2, wherein the fitting can provide charging current in most of its positions.

5. A battery charger including a casing locatable on a support surface, a charging module within the casing and at least one battery fitting on the exterior of the casing to which a battery can be fitted, the fitting providing electrical coupling between a battery and the charging module, wherein the at least one battery fitting is movable relative to the casing such that a battery coupled thereto is placeable on the same support surface as the casing, wherein the fitting is slideable in a substantially vertical direction.

6. A battery charger according to claim 2, wherein the fitting is slideable in a substantially vertical direction.

7. A battery charger according to claim 3, wherein the fitting is slideable in a substantially vertical direction.

8. A battery charger according to claim 1, comprising a plurality of said fittings.

9. A battery charger casing including at least one battery fitting mounted on the exterior of the casing to which a battery can be fitted, the fitting providing electrical coupling between a battery and the charging module, wherein the at least one battery fitting is movable between upper and lower positions for allowing a battery coupled thereto to rest on a same support surface as the casing.

* * * * *